(12) United States Patent
Nakamori

(10) Patent No.: US 11,796,860 B2
(45) Date of Patent: Oct. 24, 2023

(54) ILLUMINATION DEVICE

(71) Applicant: Japan Display Inc., Tokyo (JP)

(72) Inventor: Yosuke Nakamori, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/888,544

(22) Filed: Aug. 16, 2022

(65) Prior Publication Data

US 2023/0057744 A1 Feb. 23, 2023

(30) Foreign Application Priority Data

Aug. 19, 2021 (JP) ................. 2021-134024

(51) Int. Cl.
*G02F 1/13357* (2006.01)
*G02F 1/1335* (2006.01)
*F21V 8/00* (2006.01)

(52) U.S. Cl.
CPC ..... *G02F 1/133603* (2013.01); *G02B 6/0078* (2013.01); *G02F 1/133601* (2021.01); *G02F 1/133608* (2013.01)

(58) Field of Classification Search
CPC ......... G02F 1/133603; G02F 1/133608; G02F 1/133601; G02B 6/0078
See application file for complete search history.

(56) References Cited

U.S. PATENT DOCUMENTS

| | | | | |
|---|---|---|---|---|
| 10,670,791 | B2* | 6/2020 | Chen | G02B 6/0031 |
| 2009/0290093 | A1* | 11/2009 | Shimura | G02F 1/133606 |
| | | | | 362/613 |
| 2011/0211141 | A1* | 9/2011 | Cho | G02B 6/0078 |
| | | | | 257/89 |
| 2012/0013811 | A1* | 1/2012 | Shimizu | G02B 6/0055 |
| | | | | 348/739 |
| 2013/0107574 | A1* | 5/2013 | Baek | G02F 1/133603 |
| | | | | 362/612 |
| 2018/0314110 | A1* | 11/2018 | Chen | G02F 1/133602 |
| 2019/0094619 | A1* | 3/2019 | Park | |

FOREIGN PATENT DOCUMENTS

| | | | | |
|---|---|---|---|---|
| CN | 109270735 B | * | 8/2021 | G02B 5/0242 |
| JP | 2017-116683 A | | 6/2017 | |
| JP | 2020-205183 A | | 12/2020 | |

* cited by examiner

*Primary Examiner* — Erin Kryukova
(74) *Attorney, Agent, or Firm* — Michael Best & Friedrich LLP

(57) ABSTRACT

According to one embodiment, an illumination device includes a first light emitting element, a second light emitting element, an overcoat layer covering the first and second light emitting elements, a first transparent block disposed on the overcoat layer and overlapping the first light emitting element, a second transparent block disposed on the overcoat layer and overlapping the second light emitting element, and an optical sheet group disposed on the first transparent block and the second transparent block. A first side surface of the first transparent block and a second side surface of the second transparent block face each other. An air layer is interposed between the first side surface and the second side surface.

10 Claims, 10 Drawing Sheets

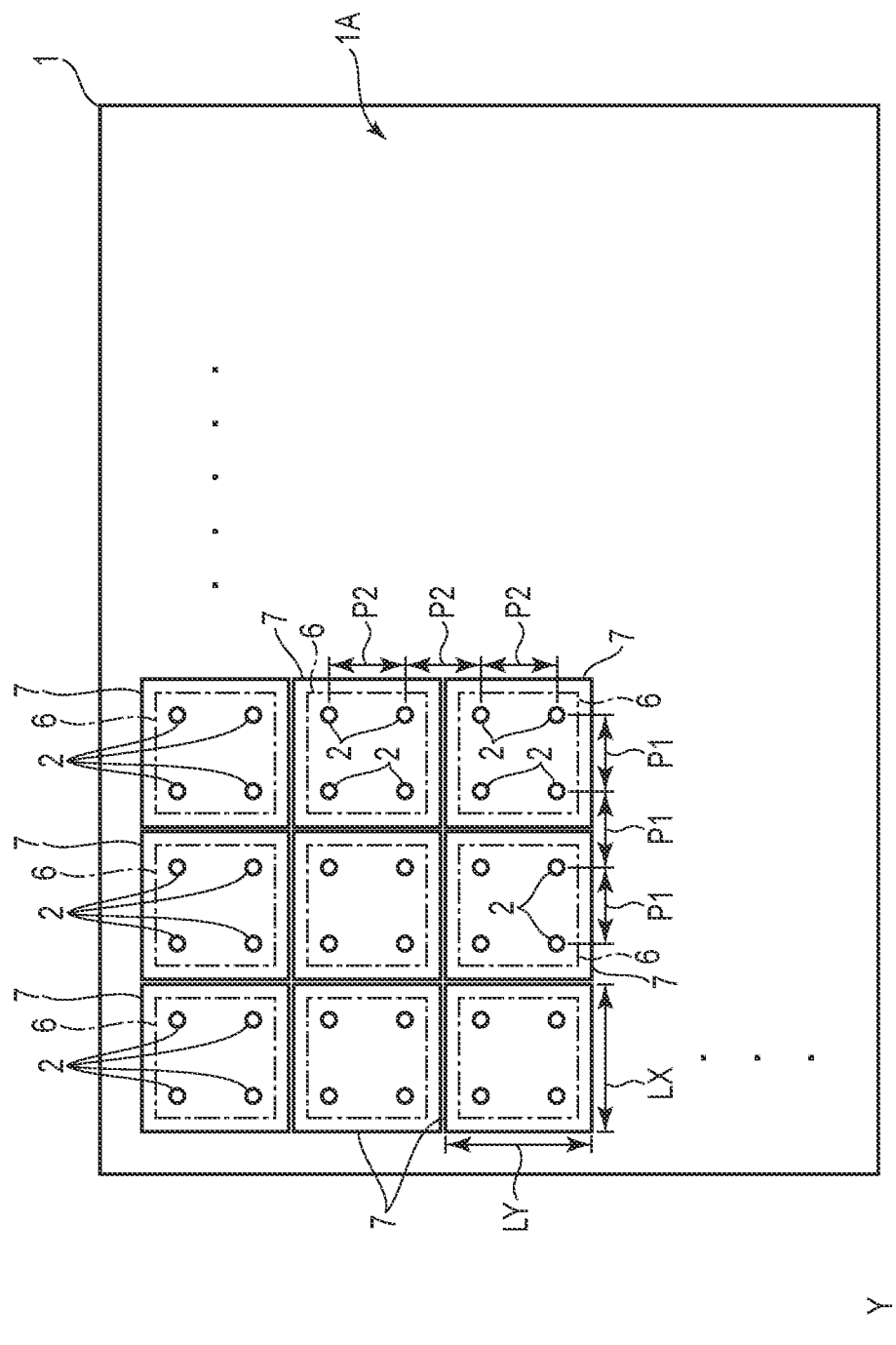
F I G. 5

ILLUMINATION DEVICE

CROSS-REFERENCE TO RELATED APPLICATIONS

This application is based upon and claims the benefit of priority from Japanese Patent Application No. 2021-134024, filed Aug. 19, 2021, the entire contents of which are incorporated herein by reference.

FIELD

Embodiments described herein relate generally to an illumination device.

BACKGROUND

A transmissive display device such as liquid crystal display devices comprises an illumination device overlapping a display panel. As the illumination device, a side-edge type illumination device comprising a light guide opposed to a display panel and light emitting elements arranged along a side surface of the light guide, and a direct type illumination device comprising light emitting elements arranged directly under a display panel are known.

On the other hand, local dimming is known as one of the control methods of an illumination device. When the illumination area of the minimum unit of local dimming is referred to as a segment, it is required that the areas of segments be reduced and the spread of light from each segment to the other adjacent segments be suppressed in order to achieve more precise local dimming.

BRIEF DESCRIPTION OF THE DRAWINGS

FIG. 5 is another plan view illustrating the circuit board 1 on which the light emitting elements 2 are mounted, and the transparent block layer 4.

DETAILED DESCRIPTION

Figure 1:
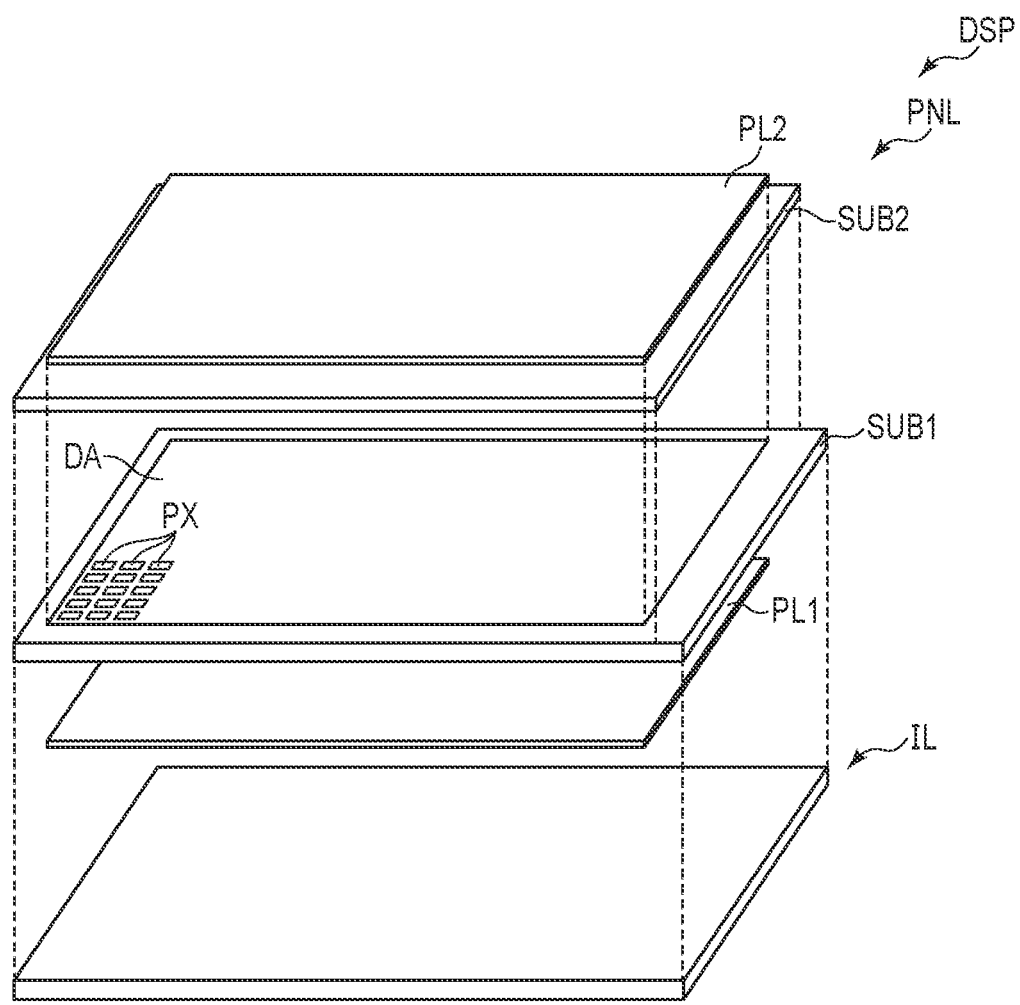
FIG. 1 is a schematic exploded perspective view of a display device DSP according to an embodiment.

In general, according to one embodiment, an illumination device includes, a circuit board, light emitting elements including a first light emitting element and a second light emitting element mounted on the circuit board, an overcoat layer being transparent and covering the circuit board and the light emitting elements, a first transparent block disposed on the overcoat layer and overlapping the first light emitting element, a second transparent block disposed on the overcoat layer, adjacent to the first transparent block, and overlapping the second light emitting element, and an optical sheet group disposed on the first transparent block and the second transparent block. A first side surface of the first transparent block and a second side surface of the second transparent block face each other. An air layer is interposed between the first side surface and the second side surface.

One of the embodiments will be described hereinafter with reference to the accompanying drawings.

The disclosure is merely an example, and proper changes within the spirit of the invention which are easily conceivable by a person having ordinary skill in the art are included in the scope of the present invention as a matter of course. In addition, in some cases, in order to make the description clearer, the drawings may be produced more schematically than in the actual modes, but they are mere examples and do not limit the interpretation of the present invention. In the drawings, the reference symbols of the same or similar elements arranged sequentially may be omitted.

In the specification and drawings, the structural elements that have the same or similar functions as or to those described in connection with preceding drawings are denoted by the same reference symbols, and a detailed description thereof may be omitted.

In the present embodiment, a first direction X, a second direction Y, and a third direction Z are defined as illustrated in the drawings. The first direction X, the second direction Y, and the third direction Z are orthogonal to each other but may cross at an angle other than 90°. In the following description, viewing an X-Y plane defined by the first direction X and the second direction Y is referred to as planar view.

FIG. 1 is a schematic exploded perspective view of a display device DSP according to the present embodiment.

The display device DSP comprises an illumination device IL, a display panel PNL, a first polarizer PL1, and a second polarizer PL2. In the present embodiment, a liquid crystal display device is disclosed as an example of the display device DSP. The display panel PNL is, for example, a transmissive or transflective liquid crystal display panel. The display panel PNL is located between the first polarizer PL1 and the second polarizer PL2.

The illumination device IL is opposed to the display panel PNL in the third direction Z. The illumination device IL emits light toward the display panel PNL and illuminates the display panel PNL. The illumination device IL of the example illustrated functions as a backlight unit of the display device DSP.

The display panel PNL comprises a first substrate SUB1, a second substrate SUB2, and a liquid crystal layer (not illustrated). The second substrate SUB2 is opposed to the first substrate SUB1 in the third direction Z. The liquid crystal layer is located between the first substrate SUB1 and the second substrate SUB2. The display panel PNL comprises a display area DA where an image is displayed. The display area DA comprises pixels PX.

The pixels PX are arranged in a matrix in the first direction X and the second direction Y. Each of the pixels PX includes, for example, a red sub-pixel, a green sub-pixel, and a blue sub-pixel, although not described in detail. The sub-pixels each comprises a switching element, a pixel electrode connected to the switching element, and a common electrode opposed to the pixel electrode.

The first polarizer PL1 is attached to the first substrate SUB1, and the second polarizer PL2 is attached to the second substrate SUB2. The first polarizer PL1 and the second polarizer PL2 overlap the whole area of the display area DA in the third direction Z.

The illumination device IL is configured to illuminate at least the whole area of the display area DA of the display panel PNL. The display panel PNL is configured to display an image by selectively transmitting light emitted from the illumination device IL.

Figure 2:
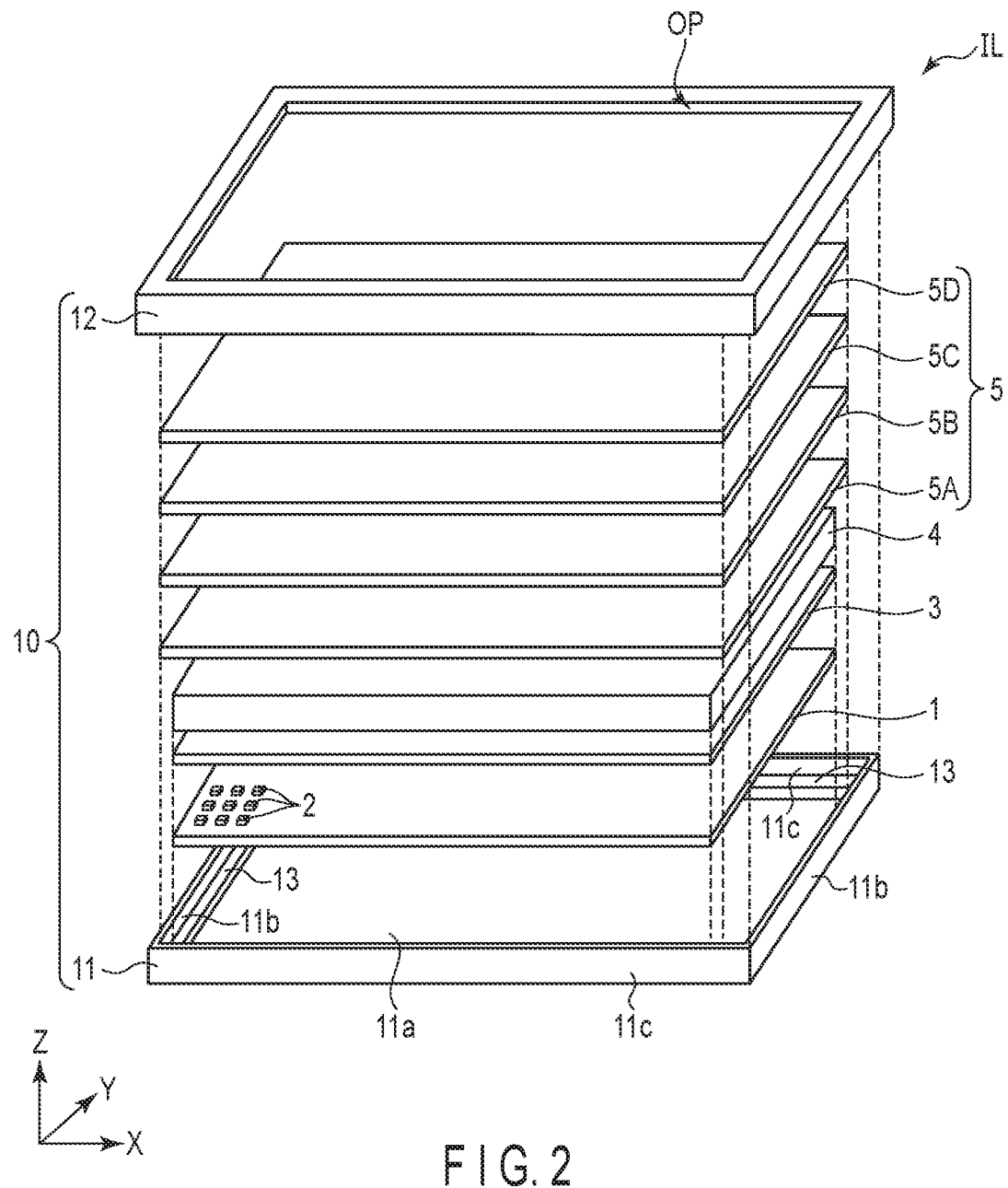
FIG. 2 is a schematic exploded perspective view of an illumination device IL according to the embodiment.

FIG. 2 is a schematic exploded perspective view of the illumination device IL according to the present embodiment.

The illumination device IL comprises a circuit board 1, light emitting elements 2, an overcoat layer 3, a transparent block layer 4, and an optical sheet group 5.

The circuit board 1 comprises a circuit for driving the light emitting elements 2, electrodes and various lines for mounting the light emitting elements 2, etc.

The light emitting elements 2 are mounted on the circuit board 1.

The overcoat layer 3 is located above the circuit board 1 and the light emitting elements 2.

The transparent block layer 4 is located above the overcoat layer 3. The transparent block layer 4 is composed of transparent blocks, which will be described in detail later.

The optical sheet group 5 is located above the transparent block layer 4. For example, the optical sheet group 5 includes a diffusion sheet 5A, a wavelength conversion sheet 5B, a prism sheet 5C, and a polarizing sheet 5D. The diffusion sheet 5A, the wavelength conversion sheet 5B, the prism sheet 5C, and the polarizing sheet 5D are stacked in this order in the third direction Z. The optical sheet group 5 may not include at least one sheet of the above four sheets and may further include another sheet.

The circuit board 1, the light emitting elements 2, the overcoat layer 3, the transparent block layer 4, and the optical sheet group 5 are accommodated in a case 10. The case 10 comprises a rear bezel 11, a front bezel 12, and a frame 13. The rear bezel 11 and the front bezel 12 are formed of metallic materials, for example, aluminum or stainless steel.

The rear bezel 11 comprises a bottom plate 11a, a pair of side plates 11b, and a pair of side plates 11c. The bottom plate 11a, the pair of side plates 11b, and the pair of side plates 11c are integrally formed.

The pair of side plates 11b each extends in the second direction Y and is opposed in the first direction X. The pair of side plates 11c each extends in the first direction X and is opposed in the second direction Y. The pair of side plates 11b and the pair of side plates 11c are, for example, provided perpendicularly to the bottom plate 11a.

The frame 13 is formed into a rectangular shape and provided along the pair of side plates 11b and the pair of side plates 11c. The frame 13 is formed of, for example, a resin material.

The circuit board 1, the overcoat layer 3, the transparent block layer 4, and the optical sheet group 5 are stacked in this order in the rear bezel 11 in the third direction Z. The front bezel 12 is coupled to the rear bezel 11. The circuit board 1, the overcoat layer 3, the transparent block layer 4, and the optical sheet group 5 are thereby held between the rear bezel 11 and the front bezel 12.

The front bezel 12 comprises a rectangular opening OP. The display panel PNL illustrated in FIG. 1 is attached to the front bezel 12 with adhesive such as double-sided tape. At this time, the first polarizer PL1 illustrated in FIG. 1 overlaps the opening OP.

Figure 3:
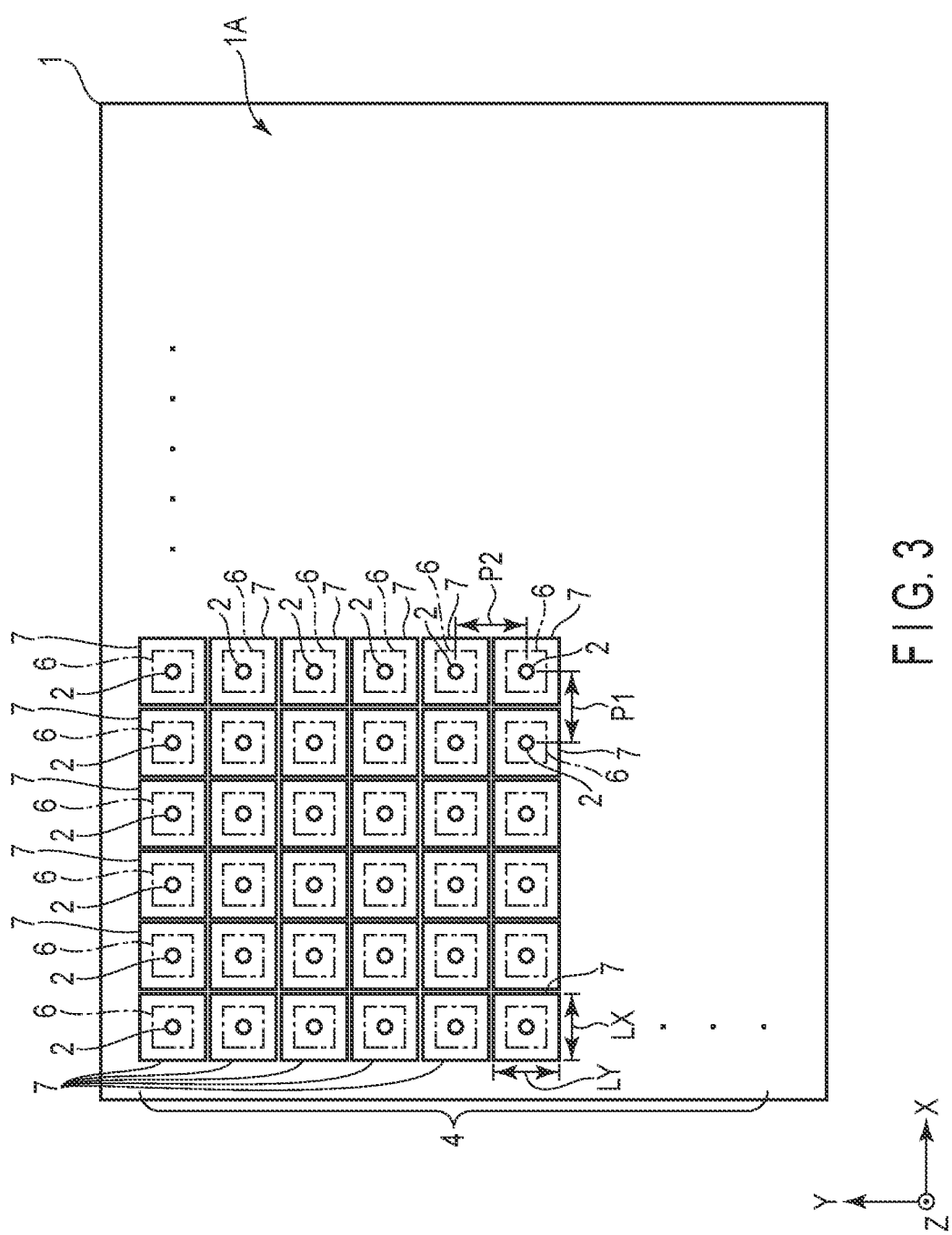
FIG. 3 is a plan view illustrating a circuit board 1, on which light emitting elements 2 are mounted, and a transparent block layer 4.

FIG. 3 is a plan view illustrating the circuit board 1, on which the light emitting elements 2 are mounted, and the transparent block layer 4.

The light emitting elements 2 are arranged in a matrix in the first direction X and the second direction Y on an upper surface (mounting surface) 1A of the circuit board 1. The light emitting elements 2 are denoted by circles of solid lines in the figure, which do not represent their exact shapes. The pitch P1 between the light emitting elements 2 arranged in the first direction X is constant, and the pitch P2 between the light emitting elements 2 arranged in the second direction Y is constant. The pitch P1 is equal to the pitch P2 and is, for example, 6 mm.

In the present specification, the minimum unit of local dimming drive control is referred to as a driven unit 6. Driven units 6 are denoted by quadrangles of alternate long and short dashed lines in the figure, which do not represent their exact shapes. To be specific, each of the driven units 6 comprises at least one light emitting element 2 and is configured to control the luminance of the at least one light emitting element 2 independently. In the example illustrated in FIG. 3, each of the driven units 6 comprises one light emitting element 2.

The transparent block layer 4 is composed of transparent blocks 7. The transparent blocks 7 are arranged in a matrix in the first direction X and the second direction Y with extremely small gaps therebetween. Each of the transparent blocks 7 is disposed to correspond to one driven unit 6. That is, one transparent block 7 is disposed to one driven unit 6. In addition, each of the transparent blocks 7 overlaps one light emitting element 2. The pitch between the transparent blocks 7 arranged in the first direction X is equal to the pitch P1 of the light emitting elements 2, and the pitch between the transparent blocks 7 arranged in the second direction Y is equal to the pitch P2 of the light emitting elements 2.

Each of the transparent blocks 7 is formed into a rectangular parallelepiped or cube and formed into a square shape in planar view. In addition, the lengths LX of the sides along the first direction X of the transparent blocks 7 are equal, and the lengths LY of the sides along the second direction Y of the transparent blocks 7 are also equal. The length LX is substantially equal to the pitch P1, and the length LY is substantially equal to the pitch P2. The transparent blocks 7 are made of resin such as acrylic resin or polycarbonate. The transparent blocks 7 may be made of glass.

Figure 4:
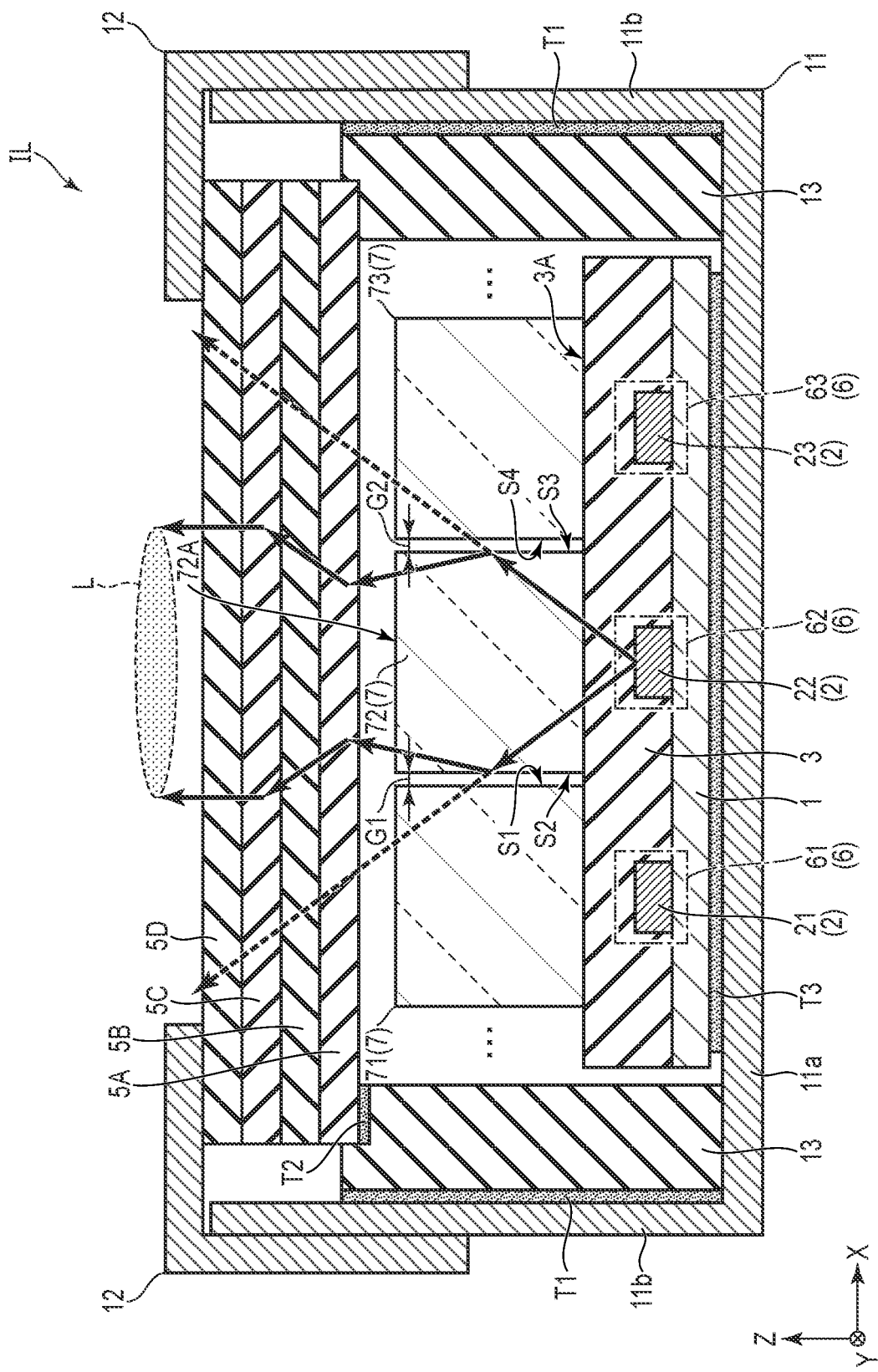
FIG. 4 is a schematic cross-sectional view of the illumination device IL including the light emitting elements 2 and transparent blocks 7 illustrated in FIG. 3.

FIG. 4 is a schematic cross-sectional view of the illumination device IL including the light emitting elements 2 and the transparent blocks 7 illustrated in FIG. 3. FIG. 4 illustrates three light emitting elements 21 to 23 arranged in the first direction X of the light emitting elements 2 and three transparent blocks 71 to 73 arranged in the first direction X of the transparent blocks 7.

The frame 13 is fixed to the side plates 11b by double-sided tape T1. The frame 13 is also fixed to the side plates 11c by double-sided tape, although not illustrated in the figure. The circuit board 1, the overcoat layer 3, and the transparent blocks 7 are disposed in an inner space surrounded by the frame 13. The diffusion sheet 5A, the wavelength conversion sheet 5B, the prism sheet 5C, and the polarizing sheet 5D are disposed on the frame 13. The sheet at the bottom of the optical sheet group 5 (i.e., the diffusion sheet 5A in the example illustrated) is fixed to the frame 13 by double-sided tape T2.

The circuit board 1 is disposed on the bottom plate 11a and fixed to the bottom plate 11a by double-sided tape T3. The circuit board 1 is, for example, a flexible printed circuit board but may be a rigid printed circuit board.

The light emitting elements 21 to 23 are mounted on the circuit board 1 at regular pitches. A driven unit 61 comprises the light emitting element 21. A driven unit 62 comprises the light emitting element 22. A driven unit 63 comprises the light emitting element 23. The luminance of the light emitting element 21, the luminance of the light emitting element 22, and the luminance of the light emitting element 23 are controlled independently in different driven units.

The light emitting elements 2 including the light emitting elements 21 to 23 are extremely small light emitting diodes (LEDs). Each of the light emitting elements 2 is, for example, a mini-LED with one side longer than 100 μm but shorter than 300 μm. The light emitting elements 2 are blue light emitting diodes which emit blue light.

The overcoat layer 3 directly covers the circuit board 1 and the light emitting elements 21 to 23. That is, the overcoat layer 3 contacts the circuit board 1 and the light emitting elements 21 to 23. The overcoat layer 3 is a transparent resin layer and has a sufficient thickness to cover the light emitting elements 21 to 23.

For example, the overcoat layer 3 is formed of acrylic resin and has a thickness of 400 μm. An upper surface 3A of the overcoat layer 3 is a substantially flat surface along the X-Y plane. The overcoat layer 3 prevents all the light emitting elements 2 including the light emitting elements 21 to 23 from falling off the circuit board 1.

The transparent blocks 7 including the transparent blocks 71 to 73 are disposed on the overcoat layer 3. As described above, each of the transparent blocks 7 overlaps one light emitting element 2. In the example illustrated, the transparent block 71 overlaps the light emitting element 21 of the driven unit 61, the transparent block 72 overlaps the light emitting element 22 of the driven unit 62, and the transparent block 73 overlaps the light emitting element 23 of the driven unit 63.

In addition, as described above, each of the transparent blocks 7 is a rectangular parallelepiped or a cube, and the side surfaces of the transparent blocks 7 are planes substantially perpendicular to the upper surface 3A of the overcoat layer 3. In the example illustrated, a side surface S1 of the transparent block 71 and a side surface S2 of the transparent block 72 are planes substantially parallel to each other and face each other with an air layer interposed therebetween. In addition, a side surface S3 of the transparent block 72 and a side surface S4 of the transparent block 73 are planes substantially parallel to each other and face each other with an air layer interposed therebetween.

In the example illustrated, an air layer is interposed between the transparent blocks 71 to 73 and the diffusion sheet 5A, but the diffusion sheet 5A may contact the transparent blocks 71 to 73.

The wavelength conversion sheet 5B has the function of absorbing light emitted from the light emitting elements 2 and converting into light of a wavelength longer than that of the absorbed light. The wavelength conversion sheet 5B is, for example, a phosphor sheet in which a phosphor is dispersed, and converts blue light emitted from the light emitting elements 2 into white light. The wavelength conversion sheet 5B may include quantum dots as a light emitting material.

The prism sheet 5C has the function of condensing light transmitted through the wavelength conversion sheet 5B. The prism sheet 5C comprises prisms on its surface opposed to the polarizing sheet 5D. The prism sheet 5C may be composed of two prism sheets, for example, one prism sheet comprising prisms extending in the first direction X and the other prism sheet comprising prisms extending in the second direction Y.

The polarizing sheet 5D is, for example, a reflective polarizing film. The polarizing sheet 5D transmits a polarization component having a predetermined polarization axis of light transmitted through the prism sheet 5C.

In the above-described illumination device IL, an optical path in a case where the light emitting element 22 turns on will be explained. The optical path is denoted by arrows in the figure, which do not represent the exact optical path due to the scale of the figure.

Blue light emitted from the light emitting element 22 is transmitted through the overcoat layer 3 and incident on the transparent block 72. Blue light propagated through the transparent block 72 is totally reflected by the interfaces between the transparent block 72 and the air layers. That is, in the example illustrated, blue light propagated through the transparent block 72 is reflected by each of the side surfaces S2 and S3. On the other hand, light entering at an angle that does not satisfy the condition of total reflection, i.e., light entering at an angle smaller than the critical angle, of blue light propagated toward the side surfaces S2 and S3 is transmitted through the transparent block 72.

Blue light totally reflected by the transparent block 72 is emitted from an upper surface 72A of the transparent block 72 and diffused moderately in the diffusion sheet 5A. Blue light transmitted through the diffusion sheet 5A is converted into white light in the wavelength conversion sheet 5B. Then, white light is condensed moderately in the prism sheet 5C, and only a predetermined polarization component of white light is transmitted through the polarizing sheet 5D.

In this manner, when the light emitting element 22 of the driven unit 62 turns on, light transmitted through the transparent block 72 corresponding to the driven unit 62 can form illumination light L directly above the driven unit 62. In addition, the undesirable spread of light to the adjacent transparent blocks 71 and 73 can be suppressed. That is, the spread of the illumination light L to the areas directly above the adjacent driven units 61 and 63 is suppressed.

In short, when the illumination area of the minimum unit of local dimming is referred to as a segment, each of the transparent blocks 7 can form one segment in planar view of the illumination device IL. In addition, when one transparent block 7 is disposed for each of the driven units 6, one segment is formed for each of the driven units 6.

A case where no air layer is interposed between the transparent blocks 71 to 73 will be described herein as a comparative example. That is, in the comparative example, a single transparent block overlaps the light emitting elements 21 to 23. In this case, blue light emitted from the light emitting element 22 is transmitted through the overcoat layer 3, and then spreads in the transparent block 72 along an optical path indicated by dotted lines in the figure. That is, illumination light spreads to the areas directly above the adjacent driven units 61 and 63, as well as the area directly above the driven unit 62, which causes enlargement of segments. In addition, the undesirable spread of illumination light causes degradation in the luminance of illumination light in the area directly above the driven unit 62.

In this manner, the present embodiment can achieve desired luminance in each segment and further enable precise local dimming, compared to the comparative example.

Moreover, the segments can be more ramified by making the pitches P1 and P2 of the light emitting elements 2 smaller and making the lengths LX and LY of each side of the transparent blocks 7 shorter.

The thicknesses of the air layers interposed between the transparent blocks 7, that is, the gaps G1 and G2 between the side surfaces facing each other, are greater than 0 μm. In order to ensure total reflection of light propagated through the transparent blocks 7, the gaps G1 and G2 should be at least 20 μm or more. On the other hand, if the gaps between the adjacent transparent blocks 7 are too large, they may be recognized as black stripes. It is therefore preferable that the gaps G1 and G2 be 100 μm or less.

In addition, in order to suppress undesirable scattering or light leakage in each surface of the transparent blocks 7, it is preferable that the side surfaces, the lower surfaces contacting the overcoat layer 3, and the upper surfaces opposed to the diffusion sheet 5A be each given a mirror finish.

In the explanation herein, for example, the light emitting element 21 corresponds to a first light emitting element, the light emitting element 22 corresponds to a second light emitting element, the transparent block 71 corresponds to a first transparent block, the transparent block 72 corresponds to a second transparent block, the side surface S1 corresponds to a first side surface, and the side surface S2 corresponds to a second side surface.

Another configuration example will be described next.

FIG. 5 is another plan view illustrating the circuit board 1, on which the light emitting elements 2 are mounted, and the transparent block layer 4. The light emitting elements 2 are denoted by circles of solid lines, the driven units 6 are denoted by quadrangles of alternate long and short dashed lines, and the transparent blocks 7 are denoted by quadrangles of solid lines.

The configuration example illustrated in FIG. 5 is different from the configuration example illustrated in FIG. 3 in that each of the driven units 6 comprises four light emitting elements 2. In each of the driven units 6, two light emitting elements 2 are arranged in the first direction X and two light emitting elements 2 are arranged in the second direction Y. These four light emitting elements 2 are, for example, electrically connected in series, and controlled together to have the same luminance.

In each of the driven units 6, the pitch P1 between the two light emitting elements 2 arranged in the first direction X is constant, and the pitch P2 between the two light emitting elements 2 arranged in the second direction Y is constant. The pitch P1 is equal to the pitch P2 and is, for example, 6 mm.

In the two driven units 6 adjacent to each other in the first direction X, the pitch between the light emitting element 2 of one driven unit 6 and the light emitting element 2 of the other driven unit 6 is also equal to the above the pitch P1.

In the two driven units 6 adjacent to each other in the second direction Y, the pitch between the light emitting element 2 of one driven unit 6 and the light emitting element 2 of the other driven unit 6 is also equal to the above pitch P2.

The transparent blocks 7 are arranged in a matrix in the first direction X and the second direction Y with extremely small gaps therebetween. Each of the transparent blocks 7 is disposed to correspond to one driven unit 6. That is, one transparent block 7 is disposed to one driven unit 6. In addition, one transparent block 7 overlaps four light emitting elements 2.

Each of the transparent blocks 7 is formed into a rectangular parallelepiped or cube, and formed into a square shape in planar view. In addition, the lengths LX of the sides along the first direction X of the transparent blocks 7 are equal, and the lengths LY of the sides along the second direction Y of the transparent blocks 7 are also equal. The length LX is substantially twice the pitch P1, and the length LY is substantially twice the pitch P2.

Figure 6:
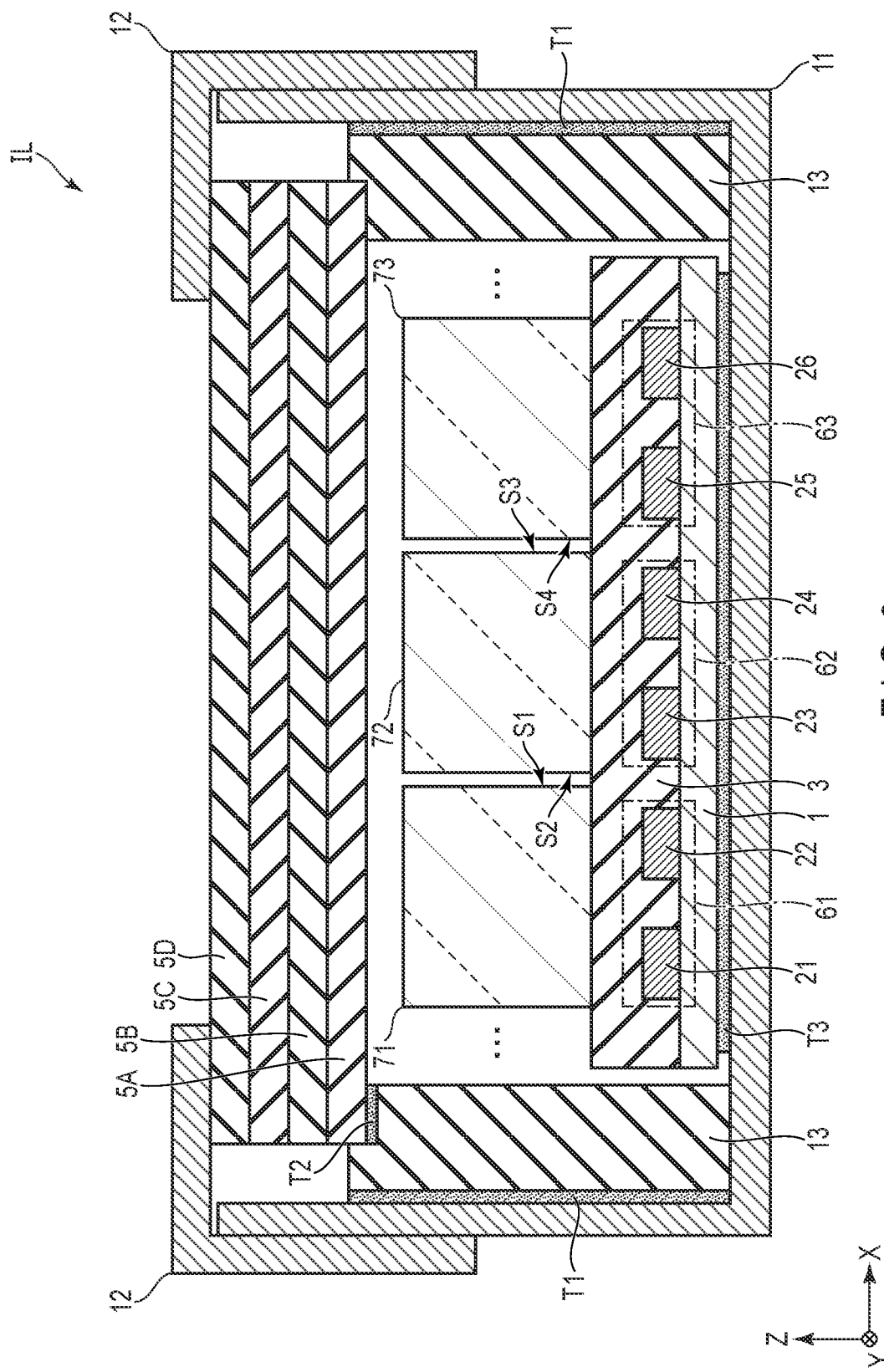
FIG. 6 is a schematic cross-sectional view of the illumination device IL including the light emitting elements 2 and the transparent blocks 7 illustrated in FIG. 3.

FIG. 6 is a schematic cross-sectional view of the illumination device IL including the light emitting elements 2 and the transparent blocks 7 illustrated in FIG. 3. FIG. 6 illustrates six light emitting elements 21 to 26 arranged in the first direction X of the light emitting elements 2 and the three transparent blocks 71 to 73 arranged in the first direction X of the transparent blocks 7.

The light emitting elements 21 to 26 are mounted at regular pitches on the circuit board 1. The driven unit 61 comprises the light emitting elements 21 and 22. The driven unit 62 comprises the light emitting elements 23 and 24. The driven unit 63 comprises the light emitting elements 25 and 26.

The overcoat layer 3 directly covers the circuit board 1 and the light emitting elements 21 to 26.

The transparent blocks 7 including the transparent blocks 71 to 73 are disposed on the overcoat layer 3. In the example illustrated, the transparent block 71 is disposed to correspond to the driven unit 61 and overlaps the light emitting elements 21 and 22. The transparent block 72 is disposed to correspond to the driven unit 62 and overlaps the light emitting elements 23 and 24. The transparent block 73 is disposed to correspond to the driven unit 63 and overlaps the light emitting elements 25 and 26.

The side surface S1 of the transparent block 71 and the side surface S2 of the transparent block 72 are planes substantially parallel to each other and face each other with the air layer interposed therebetween. In addition, the side surface S3 of the transparent block 72 and the side surface S4 of the transparent block 73 are planes substantially parallel to each other and face each other with the air layer interposed therebetween.

In the example illustrated, the air layer is interposed between the transparent blocks 71 to 73 and the diffusion sheet 5A, but the diffusion sheet 5A may contact the transparent blocks 71 to 73.

This configuration example also can achieve the same advantages as those described above. In addition, since light emitting elements 2 overlap one transparent blocks 7, the segment formed by one transparent block 7 can have high luminance. Moreover, if the pitch between the light emitting elements 2 is equal to that of the configuration example illustrated in FIG. 3, the area of each of the transparent blocks 7 increases approximately fourfold in planar view, and the segments can be enlarged.

Figure 7:
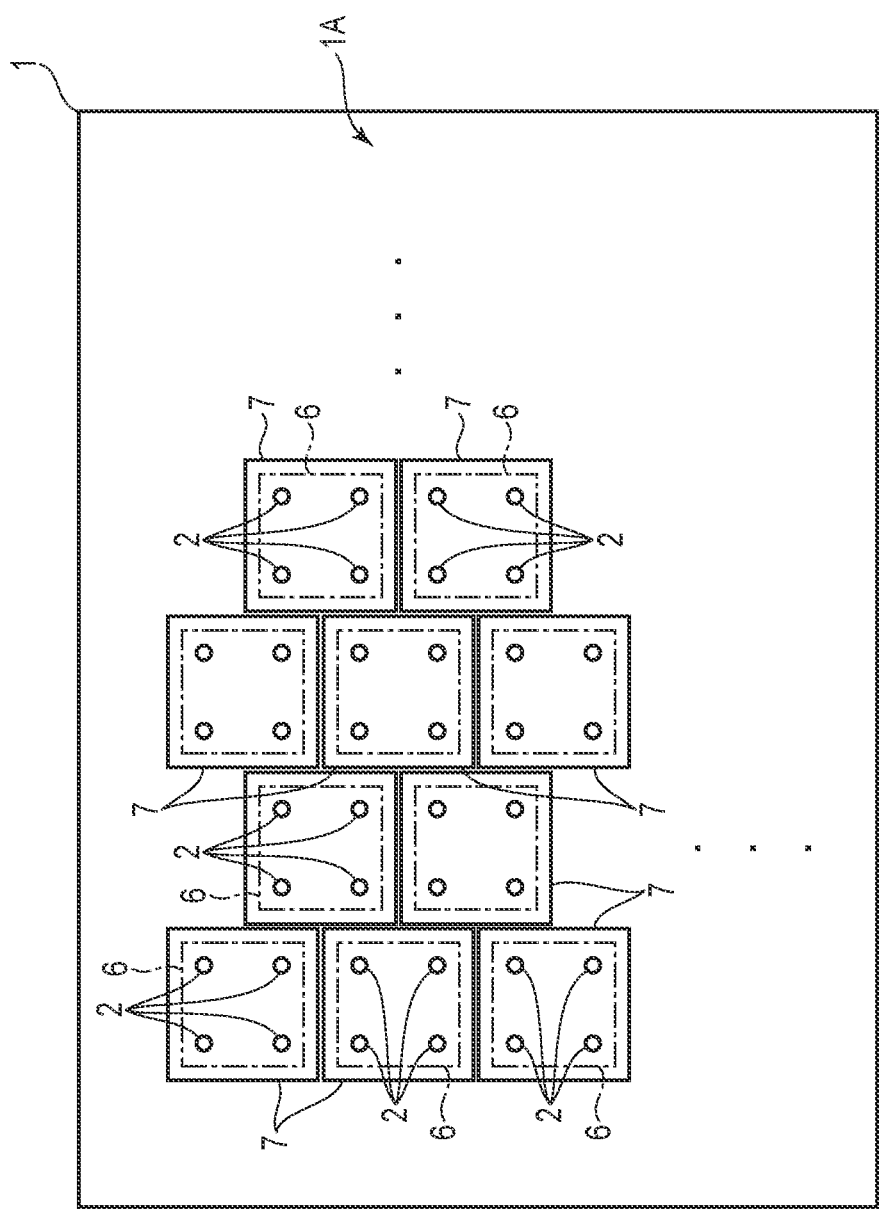
FIG. 7 is another plan view illustrating the circuit board 1 on which the light emitting elements 2 are mounted, and the transparent block layer 4.

FIG. 7 is another plan view illustrating the circuit board 1, on which the light emitting elements 2 are mounted, and the transparent block layer 4. The light emitting elements 2 are denoted by circles of solid lines, the driven units 6 are denoted by quadrangles of alternate long and short dashed lines, and the transparent blocks 7 are denoted by quadrangles of solid lines.

The configuration example illustrated in FIG. 7 is different from the configuration example illustrated in FIG. 5 in that the driven units 6 and the transparent blocks 7 are staggered. For example, regarding the arrangement of the transparent blocks 7, the transparent blocks 7 arranged in the first direction X are shifted by half the pitch in the second direction Y. Each of the transparent blocks 7 is adjacent to the surrounding six transparent blocks 7.

Each of the transparent blocks 7 is disposed to correspond to one driven unit 6 and overlaps four light emitting elements 2.

This configuration example also can achieve the same advantages as those described above. In addition, when forming an illumination area having a curved edge, the edge can be smoothed.

Figure 8:
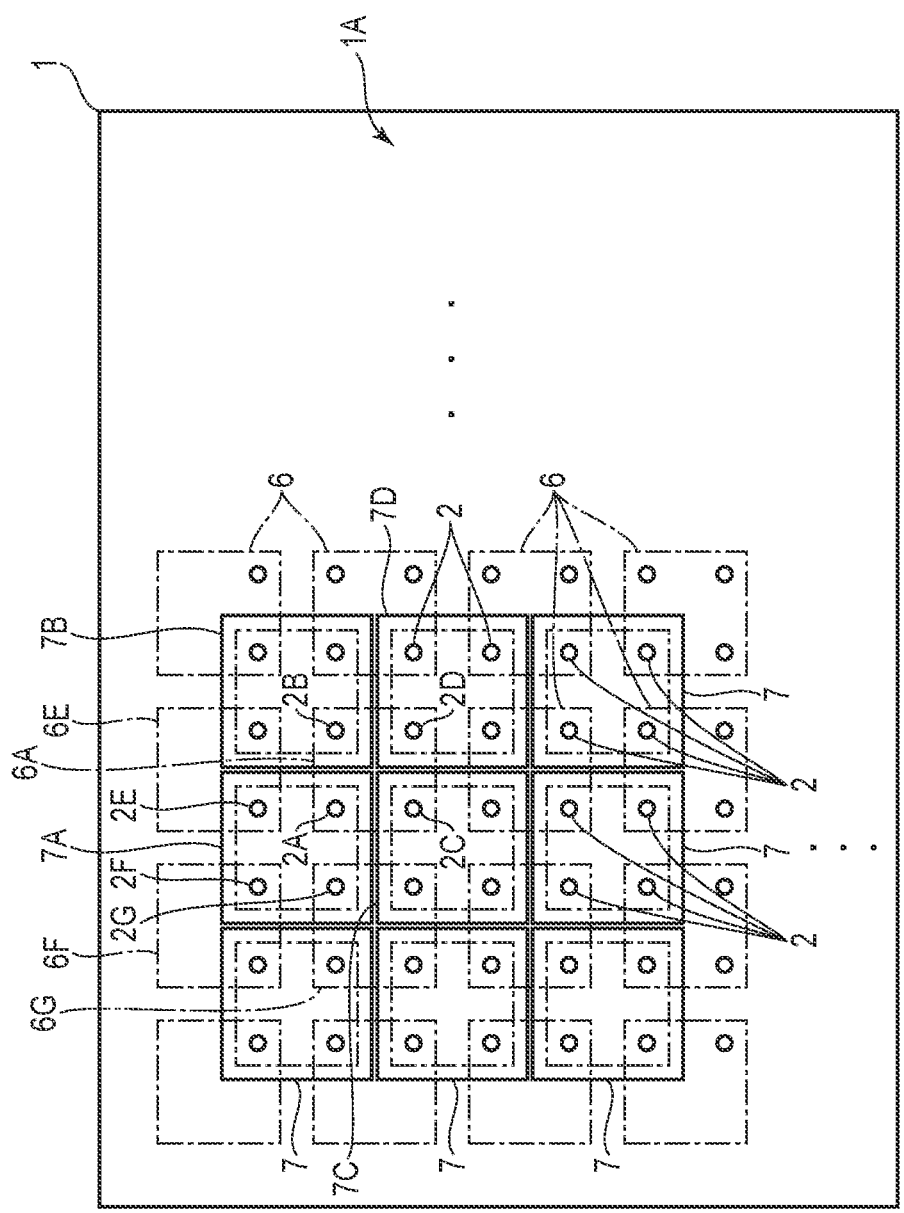
FIG. 8 is another plan view illustrating the circuit board 1 on which the light emitting elements 2 are mounted, and the transparent block layer 4.

FIG. 8 is another plan view illustrating the circuit board 1, on which the light emitting elements 2 are mounted, and the transparent block layer 4. The light emitting elements 2 are denoted by circles of solid lines, the driven units 6 are denoted by quadrangles of alternate long and short dashed lines, and the transparent blocks 7 are denoted by quadrangles of solid lines.

The configuration example illustrated in FIG. 8 is different from the configuration example illustrated in FIG. 5 in that transparent blocks 7 are disposed for each of the driven units 6. For example, a driven unit 6A in the figure comprises four light emitting elements 2A, 2B, 2C, and 2D. That is, the luminance of each of the light emitting elements 2A, 2B, 2C, and 2D are controlled in the same driven unit 6A.

For the driven unit 6A, four transparent blocks 7A, 7B, 7C, and 7D are disposed. The transparent block 7A overlaps the light emitting element 2A, the transparent block 7B overlaps the light emitting element 2B, the transparent block 7C overlaps the light emitting element 2C, and the transparent block 7D overlaps the light emitting element 2D.

From another point of view, each of the transparent blocks 7 is disposed to extend over light emitting elements 2 of driven units 6. For example, the transparent block 7A in the figure is disposed to extend over four driven units 6A, 6E, 6F, and 6G. In addition, the transparent block 7A overlaps the light emitting element 2A of the driven unit 6A, a light emitting element 2E of the driven unit 6E, a light emitting element 2F of the driven unit 6F, and a light emitting element 2G of the driven unit 6G. That is, the luminance of each of the four light emitting elements 2 overlapping one transparent block 7 is controlled independently in different driven units.

In this configuration example, when the light emitting elements 2A, 2B, 2C, and 2D of the driven unit 6A turn on, light emitted from the light emitting elements 2A, 2B, 2C, and 2D propagates through the four transparent blocks 7A, 7B, 7C, and 7D and forms illumination light. That is, the segment corresponding to the area of four transparent blocks 7 can be formed by turning on one driven unit 6.

Thus, this configuration example also can achieve the same advantages as those described above and can form large segments with low energy consumption.

In the configuration example illustrated in FIG. 8, for example, the light emitting element 2A corresponds to a first light emitting element, the light emitting element 2B corresponds to a second light emitting element, the transparent block 7A corresponds to a first transparent block, and the transparent block 7B corresponds to a second transparent block.

Figure 9:
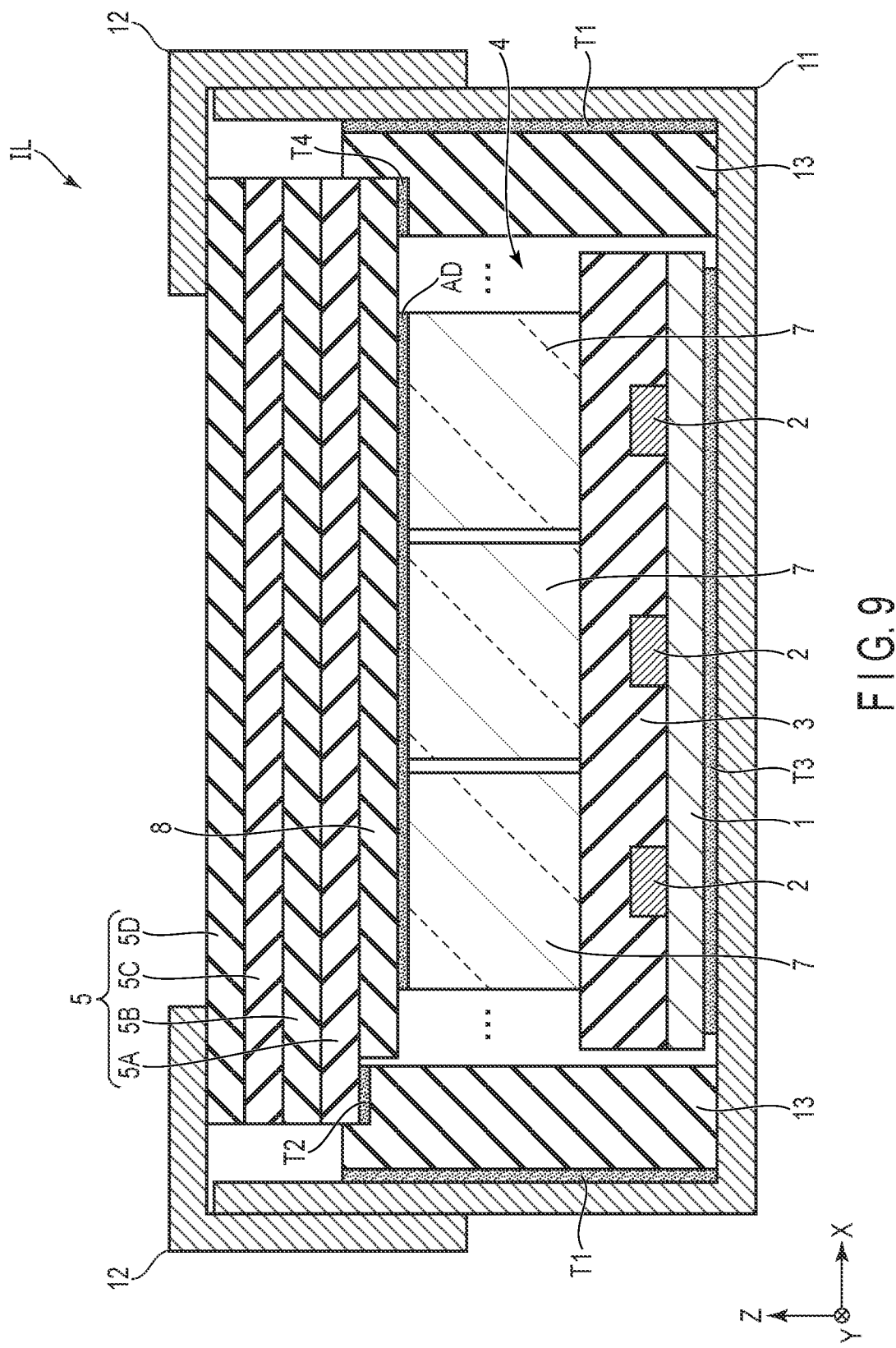
FIG. 9 is another cross-sectional view of the illumination device IL including the light emitting elements 2 and the transparent blocks 7 illustrated in FIG. 3.

FIG. 9 is another cross-sectional view of the illumination device IL including the light emitting elements 2 and the transparent blocks 7 illustrated in FIG. 3.

The configuration example illustrated in FIG. 9 is different from the configuration example illustrated in FIG. 4 in that a transparent film 8 is attached to the transparent blocks 7 constituting the transparent block layer 4. A transparent adhesive layer AD attaches the transparent blocks 7 and the transparent film 8 to each other. This suppresses a shift in the positions of the transparent blocks 7 with respect to each other. In addition, the transparent film 8 is fixed to the frame 13 by double-sided tape 14. This suppresses a shift in the positions of the light emitting elements 2 and the transparent blocks 7 with respect to each other.

The optical sheet group 5 is stacked on the transparent film 8.

The transparent blocks 7 and the transparent film 8 can be attached to each other also in the other configuration examples described above.

An experiment for measuring luminance in a case where light emitting elements turn on will be described next.

The experiment was carried out under the following conditions: nine driven units 6 are arranged in the first direction X, and the pitch between the light emitting elements 2 arranged in the first direction X of the driven units 6 is 6 mm.

In the present embodiment, the transparent blocks 7 are provided to correspond to the driven units 6, respectively, as illustrated in the upper tier. The length of one side of the transparent blocks 7 is 12 mm.

In comparative example 1, each transparent block 7 is provided to correspond to three driven units 6 as illustrated in the middle tier. The length of one side of the transparent blocks 7 is 36 mm.

In comparative example 2, each transparent block 7 is provided to correspond to nine driven units 6 as illustrated in the lower tier.

In the present embodiment and comparative examples 1 and 2, the luminance in a case where only the two light emitting elements 2 of the central driven unit 6 turn on was measured.

Figure 10:
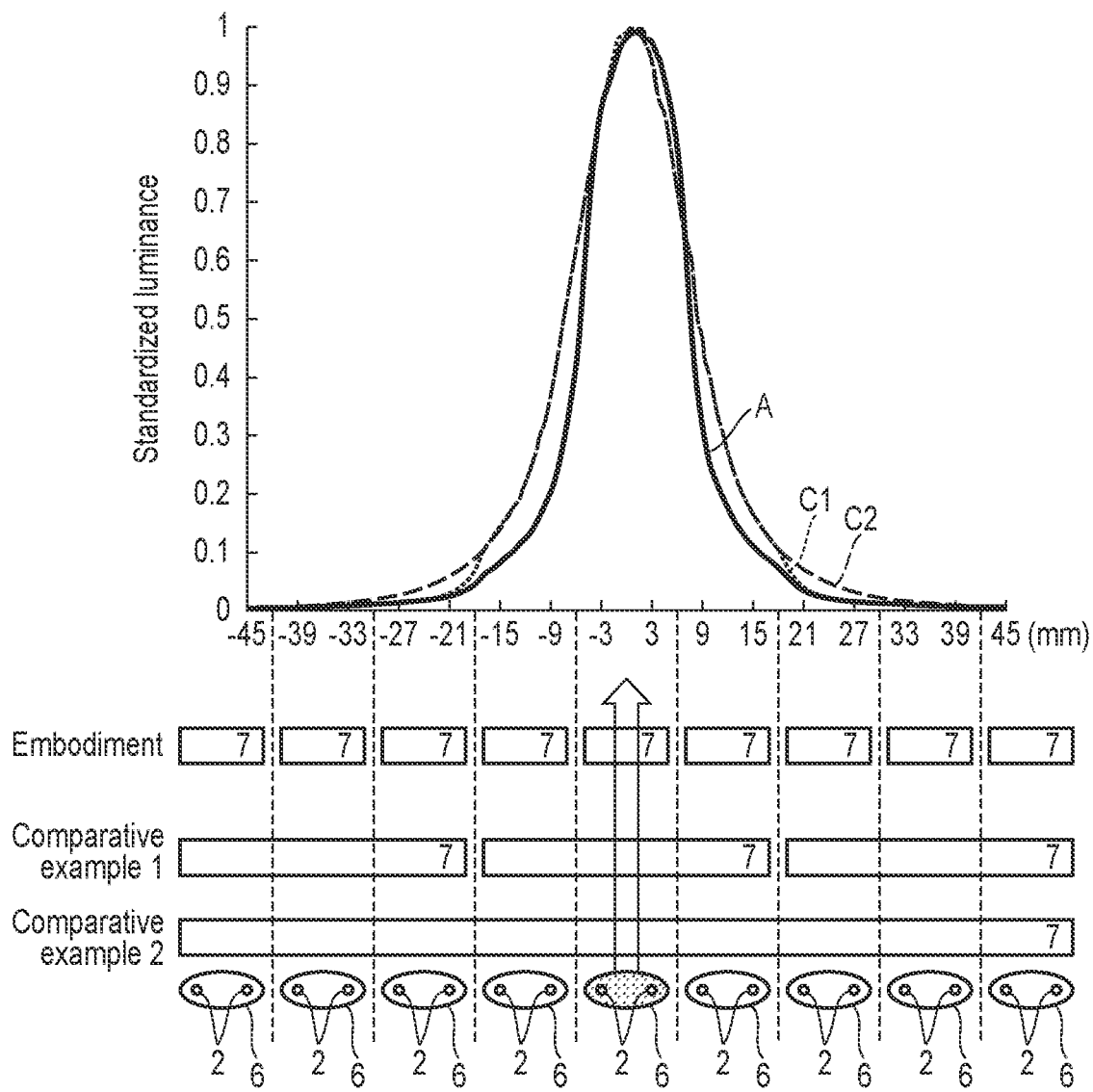
FIG. 10 is a diagram illustrating measurement results of luminance.

FIG. 10 is a diagram illustrating the measurement results of the luminance. "A" in the figure represents the measurement result of the luminance in the present embodiment, "C1" represents the measurement result of the luminance in comparative example 1, and "C2" is represents the measurement result of the luminance in comparative example 2.

When comparative examples 1 and 2 are compared, the luminance decreases at the boundaries between the transparent blocks 7 in comparative example 1. That is, it has been confirmed that the spread of illumination light to the adjacent transparent blocks 7 (or the spread of illumination light to the areas directly above the adjacent driven units 6) can be suppressed by arranging the transparent blocks 7.

In addition, when the present embodiment and comparative example 1 are compared, it has been confirmed that in the present embodiment, when the maximum luminance in the area directly above the turning on light emitting elements 2 is one, the luminance at the boundaries with the adjacent transparent blocks 7 is approximately ½, and the spread of illumination light can be further suppressed.

For reference, in the present embodiment and comparative examples 1 and 2, the luminance of illumination light in a case where all the light emitting elements 2 turn on was measured to confirm that equivalent luminance was achieved.

Furthermore, in the present embodiment and comparative examples 1 and 2, the color chromaticity of illumination light in a case where all the light emitting elements 2 turn on was measured to confirm that equivalent color chromaticity was achieved.

In the above-described embodiment, the case where the transparent blocks 7 are formed into a square shape in planar view has been described. However, the transparent blocks 7 may be formed into a rectangular shape, a polygonal shape other than a quadrangle, a circular shape, or an elliptical shape. Each of the side surfaces of the transparent blocks 7 is not limited to a plane and may be a curved surface.

Moreover, at least one of the double-sided tape T1 to 14 may be replaced by another adhesive member.

All of the illumination devices and display devices that can be embodied by making design changes to the illumination devices and display devices described as the embodiments of the present invention as appropriate by a person having ordinary skill in the art also fall within the scope of the present invention as long as they are in keeping with the spirit of the present invention.

Various modifications are easily conceivable within the category of the ideas of the present invention by a person having ordinary skill in the art, and the modifications are also considered to fall within the scope of the present invention. For example, additions, deletions or changes in design of the structural elements, or additions, omissions or changes in condition of the processes conducted as appropriate by a person having ordinary skill in the art in the above embodiments fall within the scope of the present invention as long as they are in keeping with the spirit of the present invention.

In addition, the other advantages of the aspects described in the embodiments, which are obvious from the descriptions of the present specification, or which can be conceived as appropriate by a person having ordinary skill in the art, are considered to be achievable by the present invention as a matter of course.

What is claimed is:

1. An illumination device comprising:
   a circuit board;
   light emitting elements including a first light emitting element and a second light emitting element mounted on the circuit board;
   an overcoat layer being transparent and covering the circuit board and the light emitting elements;
   a first transparent block disposed on the overcoat layer and overlapping the first light emitting element;
   a second transparent block disposed on the overcoat layer, adjacent to the first transparent block, and overlapping the second light emitting element; and
   an optical sheet group disposed on the first transparent block and the second transparent block,
   wherein a first side surface of the first transparent block and a second side surface of the second transparent block face each other, and
   an air layer is interposed between the first side surface and the second side surface.

2. The illumination device of claim 1, wherein
   each of the first transparent block and the second transparent block is formed into a square shape and has sides of equal length in planar view.

3. The illumination device of claim 1, wherein
   each of the first transparent block and the second transparent block is made of resin.

4. The illumination device of claim 1, wherein
   the first side surface and the second side surface are planes substantially parallel to each other.

5. The illumination device of claim 4, wherein
   a gap between the first side surface and the second side surface is 100 μm or less.

6. The illumination device of claim 1, wherein
   luminance of the first light emitting element and luminance of the second light emitting element are configured to be controlled independently indifferent driven units.

7. The illumination device of claim 1, wherein
   luminance of the first light emitting element and luminance of the second light emitting element are configured to be controlled in the same driven unit.

8. The illumination device of claim 1, further comprising
   a transparent film located between the first and second transparent blocks and the optical sheet group and attached to the first and second transparent blocks.

9. The illumination device of claim 1, wherein
   each of the light emitting elements is a blue light emitting diode, and
   the optical sheet group includes a wavelength conversion sheet.

10. The illumination device of claim 9, wherein
    the optical sheet group further includes a diffusion sheet, a prism sheet, and a polarizing sheet.

* * * * *